United States Patent [19]

Kraft et al.

[11] 4,427,270

[45] Jan. 24, 1984

[54] MICROSCOPE FRAME

[75] Inventors: Winfried Kraft, Asslar-Werdorf; Walter Froboese, Solms; Guenter Reinheimer, Biebertal; Karl Wieber, Asslar-Berghausen, all of Fed. Rep. of Germany

[73] Assignee: Ernst Leitz Wetzlar GmbH, Wetzlar, Fed. Rep. of Germany

[21] Appl. No.: 204,370

[22] PCT Filed: Dec. 18, 1979

[86] PCT No.: PCT/DE79/00148
§ 371 Date: Aug. 20, 1980
§ 102(e) Date: Aug. 20, 1980

[87] PCT Pub. No.: WO80/01320
PCT Pub. Date: Jun. 26, 1980

[30] Foreign Application Priority Data

Dec. 22, 1978 [DE] Fed. Rep. of Germany ... 7838094[U]

[51] Int. Cl.³ .............................................. G02B 21/24
[52] U.S. Cl. ................................................... 350/507
[58] Field of Search .................... 350/69, 82, 84, 240, 350/246, 256, 308; 16/115

[56] References Cited

U.S. PATENT DOCUMENTS

| 1,518,419 | 12/1924 | Styli ..................................... 350/246 |
| 1,588,442 | 6/1926 | Bugbee ............................... 350/256 |
| 2,040,066 | 5/1936 | Ursinus .............................. 350/84 X |
| 2,221,160 | 11/1940 | Worthington et al. . |
| 3,416,852 | 12/1968 | Goldbeck et al. ..................... 350/82 |
| 3,451,590 | 6/1969 | Johnson et al. .................... 16/115 X |
| 3,744,084 | 7/1973 | Fankhouser . |

FOREIGN PATENT DOCUMENTS

| 823486 | 11/1952 | Fed. Rep. of Germany . |
| 2186394 | 1/1974 | France . |
| 291616 | 6/1928 | United Kingdom .................. 16/115 |

Primary Examiner—William L. Sikes
Assistant Examiner—Matthew W. Koren
Attorney, Agent, or Firm—Schwartz, Jeffery, Schwaab, Mack, Blumenthal & Koch

[57] ABSTRACT

The stand for a microscope comprises a portion extended to receive the optical device and a transport handle (22) which may be retracted inside the stand.

8 Claims, 4 Drawing Figures

MICROSCOPE FRAME

The invention concerns a microscope stand with a stand base, a support for the optical components, and a carrying grip.

Microscopes of this type, having a carrying grip for easier carrying, are known in various forms. The carrying grip turns out to be particularly advantageous if, for example, in teaching organizations, the microscope must be frequently transported and the microscope cannot be gripped with one hand due to its construction.

Known carrying grips are either rigidly attached to the microscope, for example, screwed on, or the carrying grip is formed by a hand-fitting opening through the microscope stand which serves as a carrying handle. In the first instance, not only is the overall appearance detracted from by the projecting carrying grip, but also the space requirement is increased, which has an effect on the design of the instrument case. In the second instance, no additional space is necessary but here too the appearance of the microscope stand is detracted from. Further, due to the removal of material, the opening in the stand necessarily leads to reduced rigidity of the stand. Rigidity is often very important, however, for example, when relatively heavy auxiliary equipment such as connecting tubes, camera bodies, etc. is attached to the stand for microphotography.

The underlying problem of the invention is thus to develop a microscope stand of the type described initially supra, whereby on the one hand the appearance of the microscope is not detracted from, and on the other hand, the rigidity is completely preserved even at relatively heavy loads.

This problem is solved according to the invention in that the carrying grip is collapsibly disposed on the beam of the microscope stand. By means of this configuration, the carrying grip is not directly visible from outside when in the non-carrying position, and basically forms a unit with the microscope stand, so that the appearance of the microscope is not negatively affected and no additional space is taken up. At the same time, the configuration does not reduce the rigidity. Further, the arrangement ensures that during carrying the microscope retains substantially the same attitude as in the operating state and is not tilted; accordingly, the oculars cannot fall out of the tube during carrying.

The carrying grip may advantageously be swingable into a recess in the beam, whereby said recess may have various forms due to considerations of fabrication technology or other considerations. According to one feature of the invention, the recess may run in a U-shape around the upper edges of the beam. The carrying grip, which is swingable around a transverse axis and locks configurationally in the recess, then has a loop shape. The recess may also be T-shaped, with the associated carrying grip having an equivalent shape, with its longitudinal arm running parallel to the longitudinal edges of the beam, and said grip also being mounted so as to be swingable in and out, around a transverse axis. Further, one may have a U-shaped recess with its main edge parallel to a side edge of the beam. In this case, the rotational axis of the carrying grip is in the middle of the beam, running longitudinally, with the carrying grip also having a loop shape, or a hook shape. It goes without saying that in all the embodiments mentioned a catch or spring is furnished which catches or holds the carrying grip in its swung-out position.

According to one feature of the invention, the carrying grip may be slidable into an elongated opening for accommodating it, in the beam of the microscope stand. The carrying grip is attached to the top end of a vertically slidable bar, resulting in a shape like a cane grip. Spring-loaded means for holding or locking the carrying grip in its end positions are provided. By pressing on the key-like carrying grip it may be caused to collapse and lock configurationally in the beam, then with a second pressing it flicks out of the opening in the beam and into the carrying position. A spring catch may be used for this, for example, of the known type used in the pressure mechanism of a ball point pen.

The invention is schematically represented in the drawings by means of some embodiments, and will be described infra.

Figure 1:
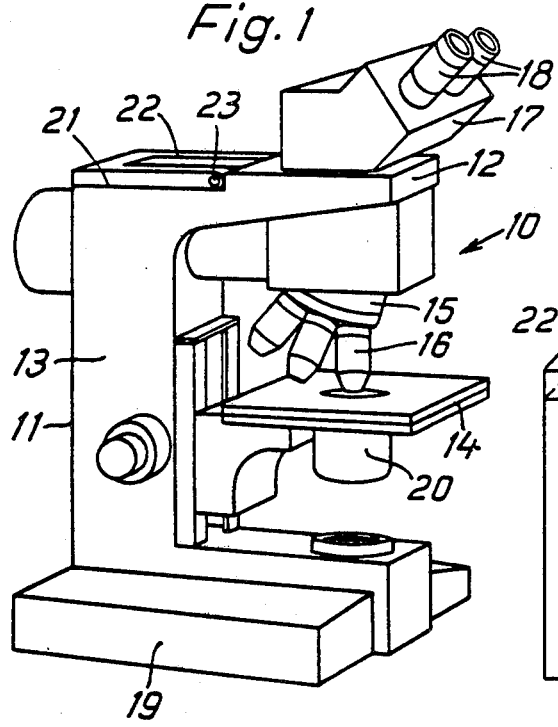
FIG. 1 is a side view of a microscope with a first embodiment of the inventive microscope stand.

In FIG. 1 a microscope 10 in known fashion basically comprises a right-angled (for example) stand 11 with a horizontal (for example) beam 12 and a vertical pillar 13, to which pillar a stage 14 is vertically slidably attached, an objective turret 15 which is mounted, for example, with ball bearings, on the underside of beam 12, for holding several objectives 16, an eyepiece tube 17 attached to the upper side of beam 12, for eyepieces 18, a stand base 19 which holds the illumination optics (not shown in detail), and a condenser 20 disposed under stage 14. Pillar 13 is relatively short, for considerations of rigidity, and its cross sectional area is relatively large; hence, it cannot be gripped with one hand. Accordingly, beam 12 has a recess 21 which runs in a U-configuration around the end of beam 12 which is opposite the eyepiece tube 17. In recess 21 there is a carrying grip 22 which is swingable around an axis 23. Carrying grip 22 is not immediately recognizable in the swung-in state in recess 21, since it locks flush with the contours of microscope 10, whereby the appearance of the microscope is not detracted from.

Figure 2:
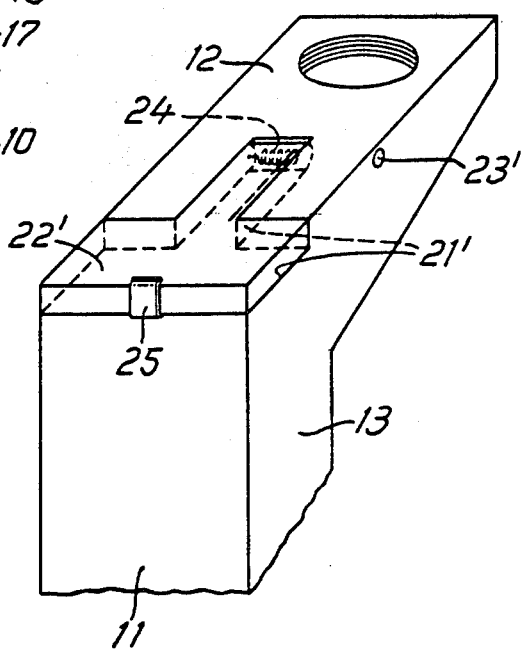
FIG. 2 is a perspective partial view of a second embodiment of the stand.

In the example embodiment of FIG. 2 the recess 21' has basically a T-shape, and is associated with a T-shaped carrying grip 22' which is swingable around an axis 23'. Carrying grip 22' has its longitudinal arm running parallel to the longitudinal edges of beam 12, and is acted on by rotational spring 24 disposed on axis 23', which spring swings it out and holds it tightly in the vertical carrying position, following the release of a spring catch 25 (e.g., a spring clip) which holds grip 22' in place in the latter's swung-in position in recess 21'. Of course, other means, in themselves known, may be furnished to lock and swing out carrying grip 22.

Figure 3:
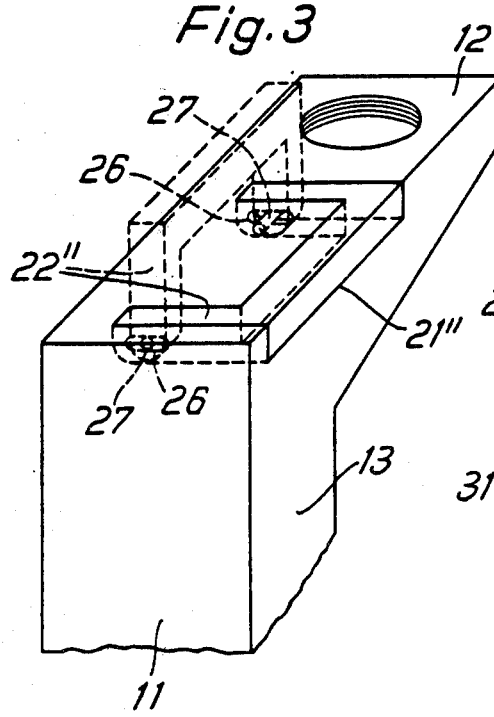
FIG. 3 is a perspective partial view of a third embodiment of the stand.

The recess 21' in the stand 11 of FIG. 3 is U-shaped, with the main edge running parallel to a side edge of beam 12. Carrying grip 22' is guided around pivots 27, here disposed in longitudinal holes 26, with said pivots being disposed centrally in beam 12 in the longitudinal direction. Carrying grip 22' thus has the shape of a hook or a loop. The carrying position of grip 22' is shown by the dashed lines.

Figure 4:
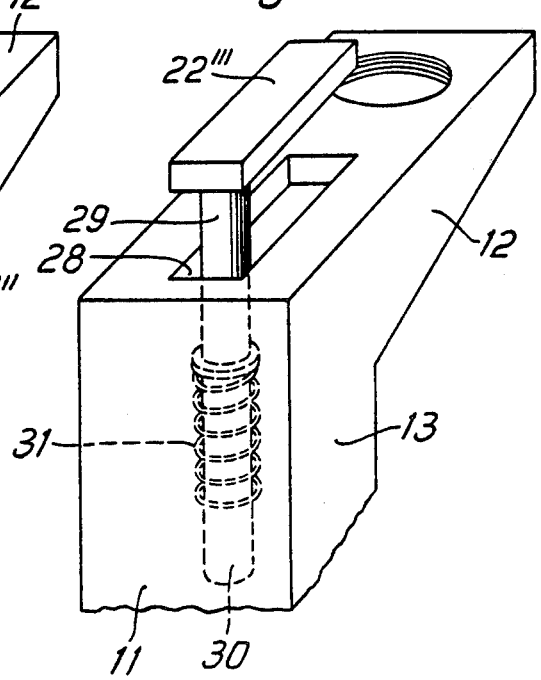
FIG. 4 is a perspective partial view of an additional embodiment of the stand.

In the example embodiment of FIG. 4, a rectangular accommodation opening 28 is provided in beam 12, with the longitudinal sides of the opening running parallel to the longitudinal edges of beam 12, whereby a carrying grip 22' is collapsible into said opening. Grip 22', like the handle of a cane, is connected on one side to a cylindrical rod 30 which is vertically slidable in a guide 29, and which runs perpendicularly to grip 22''' and is surrounded by a helical spring 31. Here too, locking means (not shown) are provided to hold carrying grip 22''', which is under the action of helical spring 31, in place in its (the grip's) collapsed position. Known locking means may be used advantageously which free carrying grip 22''' upon application of a slight pressure, and which hold grip 22''' after its is pushed into accommodation opening 28.

We claim:

1. A microscope stand comprising a stand base, an upper support for optical components projecting from said stand base, a carrying grip mounted on said upper support of the microscope stand, and means for permitting said grip to be moved from an operative position extending upwardly from said upper support to a storage position received in said upper support.

2. A microscope stand according to claim 1 wherein said means comprises a recess on the upper support and a pivot on said grip permitting said grip to swing into said recess.

3. A microscope stand according to claim 1 wherein said means comprises an accommodation opening in the upper support, a guide rod connected to said grip and a guide opening in said upper support oriented to permit said grip to slide into said accommodation opening.

4. A microscope stand according to claims 1 through 3 further including spring-loaded means for holding or locking the carrying grip in said operative and storage positions.

5. A microscope stand according to claim 4, wherein the spring-loaded means comprises a spring catch.

6. A microscope stand according to claim 1, wherein said upper support is substantially horizontal.

7. A microscope stand comprising a stand base, an upper support for optical components projecting from said stand base, a carrying grip mounted on said upper support of the microscope stand, and means for permitting said grip to be moved from an operative position extending upwardly from said upper support to a storage position received in said upper support, wherein said grip has an upper surface flush with an upper surface of said upper support when said grip is in said storage position.

8. A microscope comprising optical components and a stand, said stand comprising an upright, a base projecting outwardly from a lower portion of said upright, an upper support projecting outwardly from an upper portion of said upright in the same direction as said base, means on said upper support for mounting said optical components to said upper support, a carrying grip mounted to said upper support at a position spaced inwardly from said mounting means toward said upright, and means for permitting said grip to be moved from an operative position extending upwardly from said upper support to a storage position received in said upper support, said carrying grip being positioned on said upper support such that said microscope retains substantially the same attitude when being supported by said carrying grip as in the operating state whereby elements of said optical components cannot fall out.

* * * * *